Figure 6:
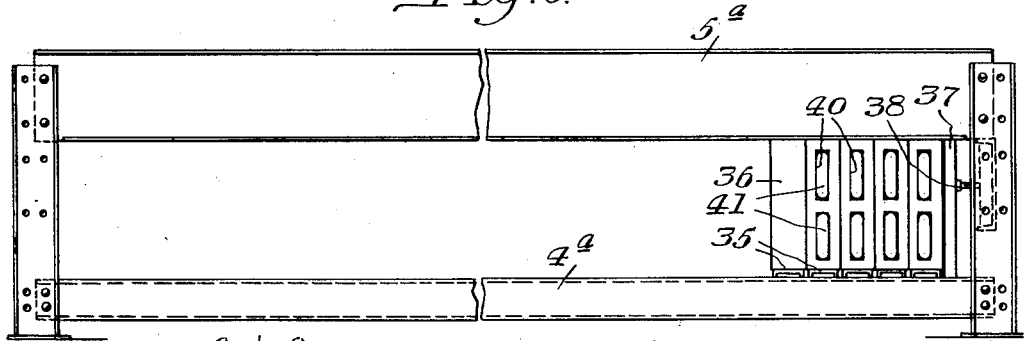

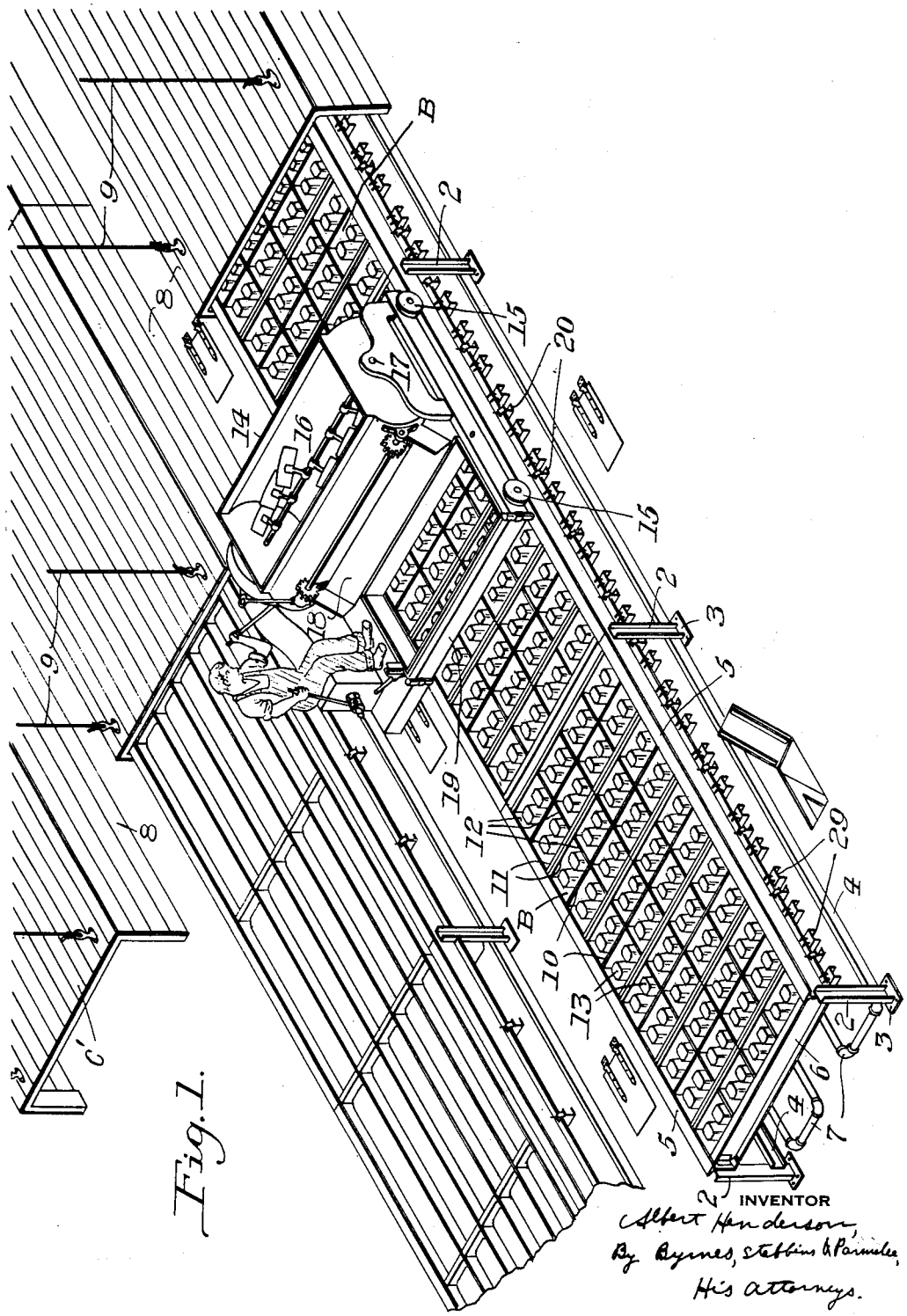

Dec. 20, 1932.   A. HENDERSON   1,891,764
METHOD AND APPARATUS FOR MAKING CEMENTITIOUS ARTICLES
Filed Aug. 29, 1928   5 Sheets-Sheet 2
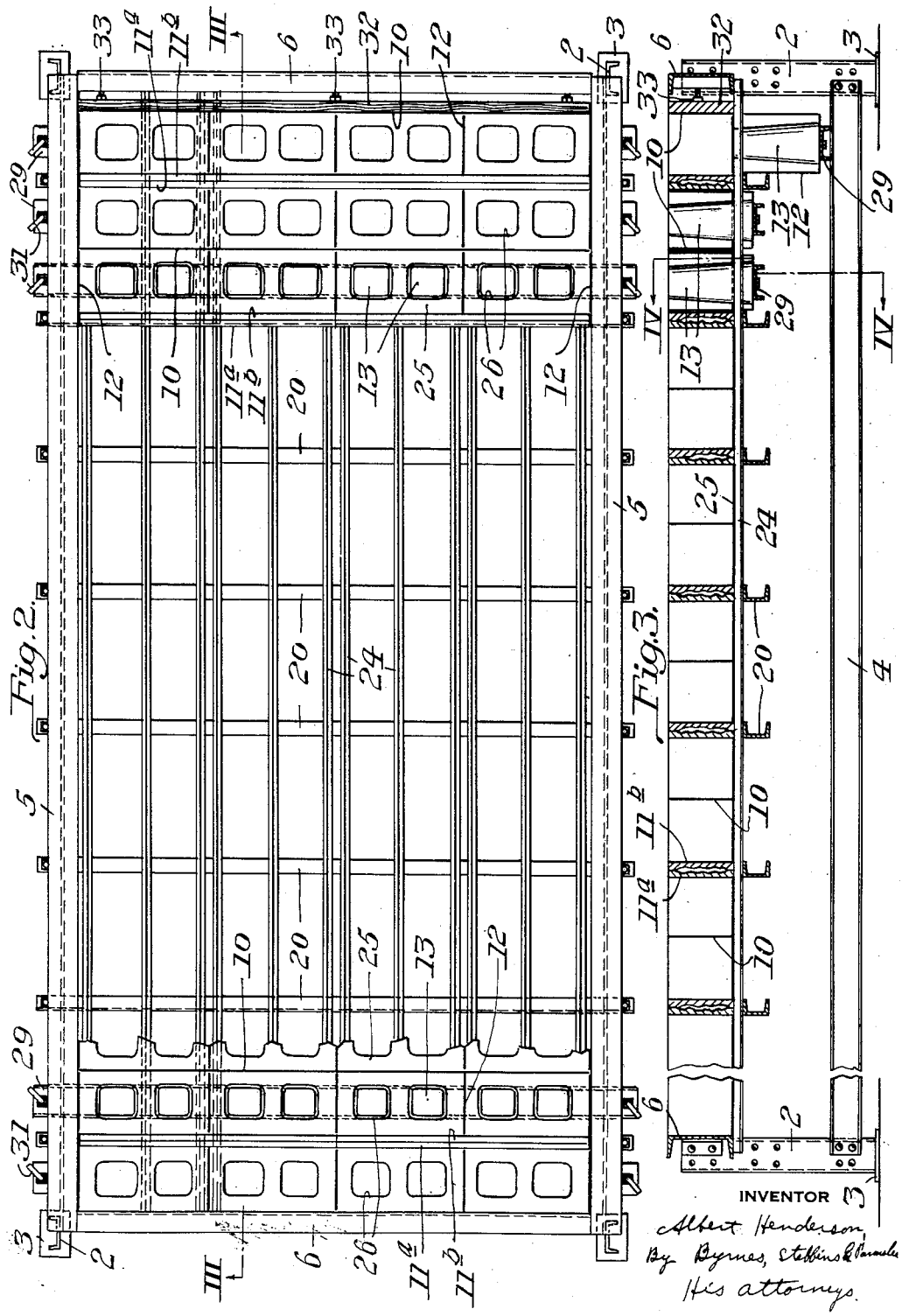
INVENTOR
Albert Henderson,
By Byrnes, Stebbins & Parmelee
His attorneys.

Dec. 20, 1932.   A. HENDERSON   1,891,764
METHOD AND APPARATUS FOR MAKING CEMENTITIOUS ARTICLES
Filed Aug. 29, 1928    5 Sheets-Sheet 3
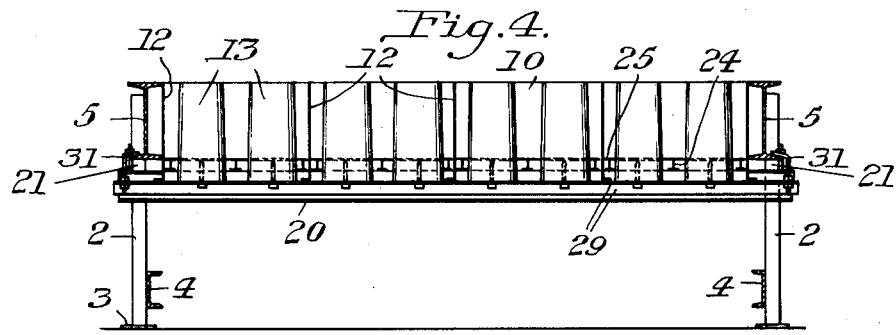
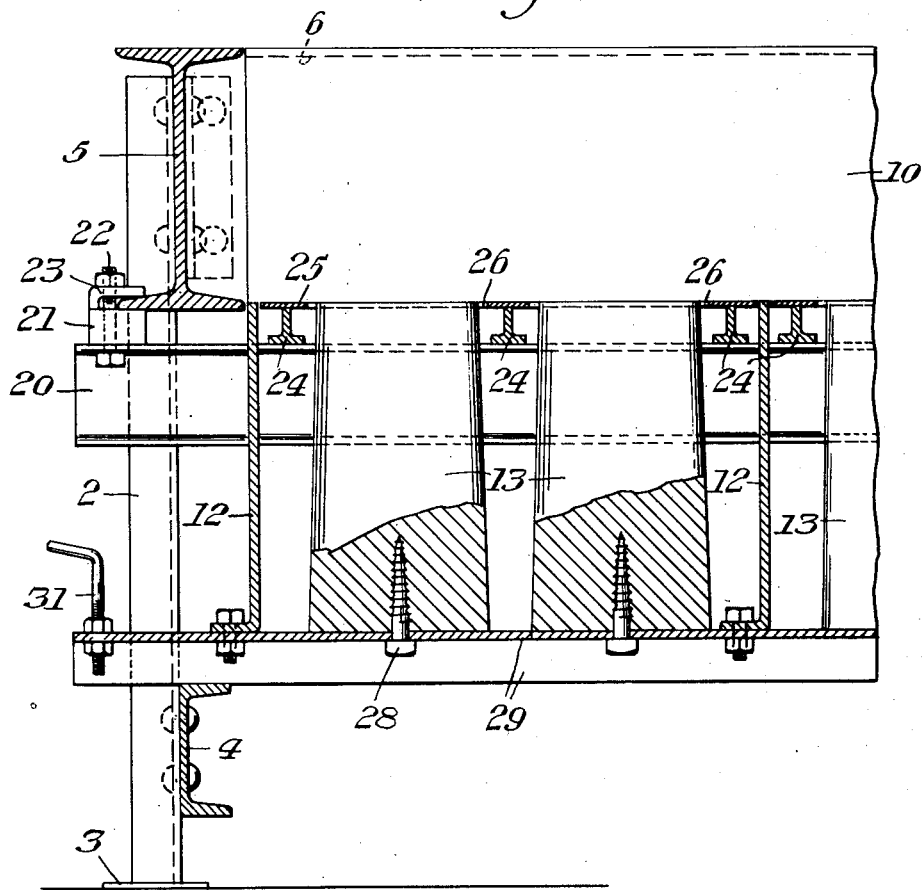
INVENTOR
Albert Henderson,
By Byrnes, Stebbins & Parmelee
His attorneys.

Dec. 20, 1932.  A. HENDERSON  1,891,764
METHOD AND APPARATUS FOR MAKING CEMENTITIOUS ARTICLES
Filed Aug. 29, 1928  5 Sheets-Sheet 4

INVENTOR
Albert Henderson,
By Byrnes, Stebbins & Parmelee
His attorneys.

Dec. 20, 1932.  A. HENDERSON  1,891,764
METHOD AND APPARATUS FOR MAKING CEMENTITIOUS ARTICLES
Filed Aug. 29, 1928  5 Sheets-Sheet 5
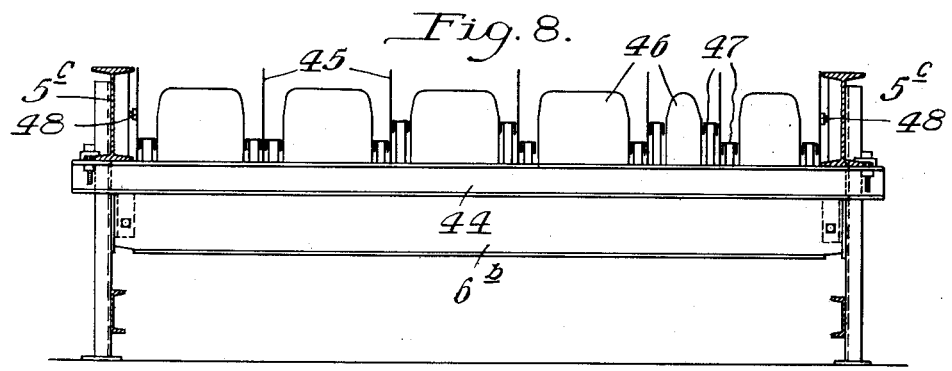
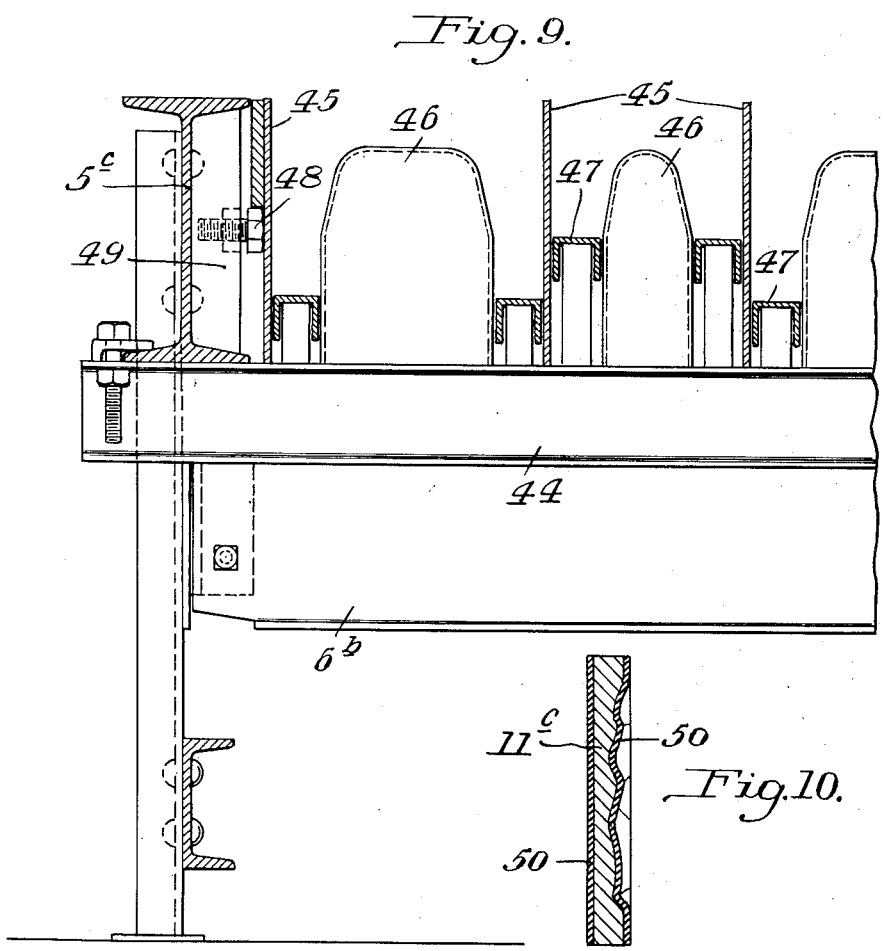
INVENTOR
Albert Henderson,
By Byrnes, Stebbins & Parmelee,
His attorneys Patented Dec. 20, 1932

1,891,764

UNITED STATES PATENT OFFICE

ALBERT HENDERSON, OF PITTSBURGH, PENNSYLVANIA, ASSIGNOR, BY MESNE ASSIGNMENTS, TO CEMENT PRODUCTS RESEARCH CORPORATION, OF PITTSBURGH, PENNSYLVANIA, A CORPORATION OF PENNSYLVANIA

METHOD AND APPARATUS FOR MAKING CEMENTITIOUS ARTICLES

Application filed August 29, 1928. Serial No. 302,690.

This invention relates to apparatus for making cementitious articles and is a division and continuation in part of my application Serial No. 241,650, filed December 21st, 1927, method of making cementitious articles.

It is particularly useful as a part of a complete plant such as described and claimed in my copending application Serial No. 295,869, filed July 28th, 1928, making cementitious articles.

Various structures for the commercial production of articles such as cement blocks, slabs, partition units and the like have been proposed, but most of them are open to numerous objections. They have required re-handling of the raw material and the product several times with a resultingly high labor and breakage cost. The equipment has been subject to rapid deterioration and many structures have been so complicated that the assembling thereof prior to casting the articles has been difficult, particularly if the several parts become rusted, worn or bent. Many of these prior structures have been open to the objection that they will not form accurate articles.

Other objections to these prior structures arise from the fact that the articles cannot be cured in situ but have to be stripped from the molds almost immediately after casting and placed in a storage yard where they are subject to the elements whereby the quality is materially impaired, and a number of the articles are frequently spoiled.

I provide a unitary apparatus for forming cementitious articles which overcomes the objections inherent in the prior structures and permits of the casting of a wide variety of cementitious articles, such as blocks of different sizes, either smooth or ornamental faced, fractional blocks, corner blocks, slabs, coping, sills, partition units, and the like.

I provide a frame which may be employed for molds for the several kinds of articles. The frame comprises legs supporting a pair of spaced rails between which the molds are placed.

I preferably employ supporting rails for bottom plates, which bottom plates are loosely mounted so as to have a reasonable amount of movement on their supports. These bottom plates have openings therethrough for the reception of cores. The cores are preferably supported by core supports extending transversely of the frame and arranged to be raised or lowered as desired. When in the raised position the cores lie in the mold cavities for the several articles to be cast and exactly register with the bottom plates. These core supports are preferably employed for supporting division plates which are moved upwardly between the bottom plates so as to define the plane of separation between adjacent mold cavities.

I also preferably employ side walls which are carried by the same supports which carry the bottom plates, these side walls also being relatively movable. Starting at one end of the unit a side wall is put in place, then a row of bottom plates with its cores and dividing end plates is abutted against the side plates. Another side plate is then positioned against the bottom plates and the dividing plates, and so on until the entire length of the unit is taken up with forms. The entire apparatus is then tightened so that the several mold parts are relatively immovable. The cores are preferably held in elevated position by devices engaging the side channels first above described. These same channels also form rails for a cement mixer which may run along the unit and discharge a cement mix thereinto. The rails further serve as a guide and support for a screed which levels off the mix after it has been supplied by the mixer. The molds are so formed that their tops are flush with the top of the rails, thus making certain that the screed will accurately smooth the top surfaces of the cast articles. The entire unit is preferably mounted on legs, or in some other manner so that a slight degree of vibration is possible. The mixer serves to vibrate the unit, thus compacting the cement mix in the forms.

Covers are provided so that the units may be enclosed and heated so as to cure the articles in place. As described in my copending application first above referred to, the curing is carried on until the initial set has been obtained, whereupon the cores are lowered and the curing is continued in situ. Provision is made for lowering the forms without the necessity of raising the covers.

The side walls employed are preferably of such character that they may be used either to form smooth face or ornamental face blocks, such as rock face blocks. In order that the proper spacing of the mold cavities in the unit may be preserved I preferably make each side wall in two parts, adapted to lie against one another. Each part has one smooth face and one ornamental face, as for example, a rock face. These two pieces may be placed with the rock faces innermost and the smooth faces outermost, thereby producing smooth faced blocks. If the parts are reversed relative to one another the rock faces are thus placed outermost and rock faced blocks may be produced.

It has been common practice heretofore to grease the several mold parts so as to eliminate sticking. I preferably employ mold parts having a rubber facing. This eliminates the greasing and if desired, the rubber faces may be figured so as to produce an ornamental block surface. For example, the rubber faces may be slightly scored so that the surfaces of the articles will be correspondingly scored in imitation of the cutting done on limestone.

Figure 11:
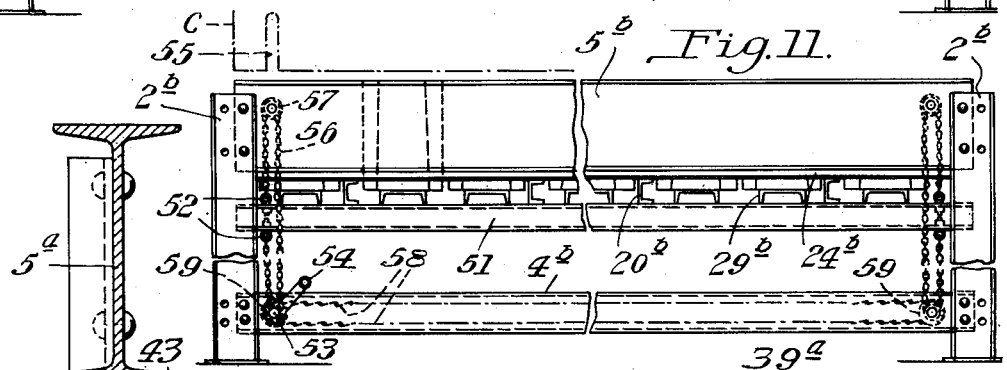
Figure 7:
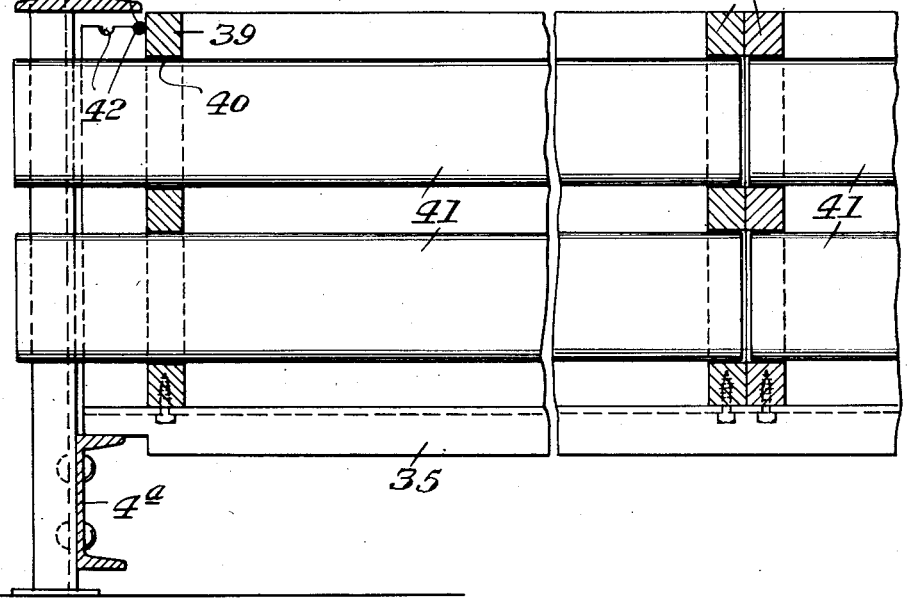

In the accompanying drawings illustrating the present preferred embodiment of my invention, Figure 1 is a perspective view showing a block unit and a part of a slab unit, Figure 2 is a top plan view of a block unit, Figure 3 is a longitudinal vertical section taken on the line III—III of Figure 2, Figure 4 is a vertical transverse section taken on the line IV—IV of Figure 3, Figure 5 is a view corresponding to a portion of Figure 4, but to enlarged scale, and showing the cores in their lowered position, Figure 6 is a side elevation of a partition unit, Figure 7 is a view corresponding to Figure 5, but showing a partition unit, Figure 8 is a view corresponding to Figure 4, but showing a slab unit, Figure 9 is a view corresponding to Figure 5, but showing a portion of a slab unit, Figure 10 is a transverse section through one of the mold portions showing the rubber facing, and Figure 11 is a side elevation of a block unit of the character shown in Figures 2 to 5 inclusive, but showing means for lowering the cores without raising the covers.

Figure 1 illustrates the general arrangement of my improved unit in position in a building. It comprises uprights 2 terminating in feet 3 which are secured to the floor. The legs 2 are connected adjacent their bottoms by channels 4 and adjacent the top by I beams 5 forming side rails.

Cross beams 6 are provided at each pair of legs 2. The units may be made up in lengths and placed end to end, being connected by the legs 2 as shown in Figure 1. The assembled units are located above steam pipes 7 whereby heat may be supplied for curing. Covers 8 are provided, these covers being suspended from cables 9 running over pulleys to counter-weights (not shown), whereby the covers may be raised or lowered as desired. During the assembling of the mold, and during casting, the covers are raised. During curing the covers are put in place, as shown in Figure 1, and the units are thereby completely enclosed. A cover in raised position is shown at C' in Figure 1.

The mold cavities are indicated generally in Figure 1. For a block unit they comprise single side walls 10 alternating with double side walls 11, these side walls being spaced by end plates 12 so as to define block mold cavities B. Cores 13 lie in each of these cavities when the parts are assembled and ready for casting. A cement mixer, indicated generally by the reference character 14, is mounted on flanged wheels 15 which run on the outer top flanges of the I beams 5. The mixer is under the control of an operator who rides with it. The mixer has a barrel 16 with mixing pedals therein. When the mix is ready for pouring, the barrel is rotated about its trunnions 17 so as to supply the mixture to a chute 18 whereby it flows into the mold cavities. As the mixer is moved along the desired amount of cement mix is supplied to the several molds. A screed 19 extends from one side rail 5 to the other. It screeds the top of the mix and insures that all of the blocks will be of the right height. The vibration of the mixer and the operation of the electric hammer 60 on the molds serves to compact the material in the molds. Mechanical vibrations 14a are employed to secure the desired results.

The details of construction of the block mold are shown in Figures 2 to 5 inclusive. The side rails 5 carry supporting channels 20, extending transversely of the unit and spaced below the bottoms of the side rails 5 by separator bars 21. The supporting channels 20 are held in place by bolts 22 engaging clips 23 which extend over the bottom outside flange of the I beam rails 5.

The supporting channels 20 carry spaced inverted T bars 24, which T bars extend longitudinally of the unit. The tops of the T bars lie in substantially the same plane as the bottom faces of the side rails 5. Bottom plates 25 lie loosely on the T bars 24. A bottom plate is provided for each mold cavity and each bottom plate has two openings 26 therein for the reception of cores 13.

The cores 13 are fastened by screws 28 to a core supporting channel 29. A core supporting channel is provided for each transverse row of blocks. In the illustrated unit each row forms four blocks. The end rows are divided into separate block forming cavities by end plates 12 secured to the core channels 29. These end plates fit between the ends of adjacent bottom plates 25 in each transverse row.

In Figure 5 the core channel is shown in its lowered position, resting on the side channels 4. It will be noted that in this position the tops of the cores 27 and the end plates 12 are flush with the top plane of the bottom plates 25. Stated in another way, the cores and end plates are never entirely out of the plane of the bottom plates. This insures that the parts will be kept in substantially the desired relative position. When the molds are disassembled it is also of advantage to have the tops of the cores flush with the tops of the bottom plates, as it reduces the likelihood of blocks being scraped or broken when they are removed from the molds.

The core channels may be raised or lowered, but have a limited degree of freedom of movement longitudinally of the unit. This freedom of movement is provided to insure that the cores and the bottom plates will properly register. As shown in Figure 3, two core channels with their cores and end plates are provided between each pair of adjacent supporting channels 20.

Each core channel is provided with a hanger 31 in the form of a rotatable hook. When the upper branch of the hook is turned outwardly, as shown in Figure 5, the core channel with its attached cores and end plates may be lowered. When the core is raised the hangers are turned so that the upper hook portions lie over and engage the bottom outer flange of the side rails 5, thus holding the cores in elevated position.

Figure 3 best shows the manner of assembling the units preparatory to casting blocks. It will be noted that the cross rail 6 at the left hand end of the unit forms one side wall for the first row of blocks. The first row of bottom plates 25 is abutted against the channel 6 and the cores are put in place. The front face of the first course of blocks is formed by a side wall made of two plates 11a and 11b. Each of the plates 11a and 11b has one smooth face and one indented face. The indented face may be of some configuration as to provide rock face blocks, if desired. As shown in Figure 3, the indented faces lie adjacent one another so that with the side plates 11a and 11b in proper position the outer faces are exposed whereby smooth faced blocks are formed. If it is desired to make rock faced blocks it is only necessary to reverse the relative position of the side plates 11a and 11b whereby the recessed faces are outermost. In either case, the side plates 11a and 11b, when in proper relative position, form a member of constant width. It will be noted that these double side walls lie above the supporting channels 20 and are at least as wide as such channels. This leaves ample room for the core structures.

After the double side walls 11a and 11b have been put in place the next row of bottom plates 25 is abutted against the side plate 11b, the cores are put in place, and then a single thickness side wall 10 is inserted.

The operation is repeated until the entire length of the unit is filled. The last plate 10 is backed with a filler plank 32 and this is engaged by a wedge bolt 33 threaded in a wedge block 34 fitting between the flanges of the end rail 6. The wedge bolts 33 may be easily tightened by wrenches and the entire set of forms is thus held immovable.

It will be noted that the tops of the cores and of the side and end walls are flush with the tops of the rails 5. This insures that the screed will properly smooth the tops of the articles after the forms have been filled.

After the forms have thus been tightened up the cement mixer is run along the rails 5 and the forms are filled and screeded. After filling and screeding the covers 8 are lowered and the curing of the articles is effected in the manner above described.

When the articles have been cured the covers are raised and the wedge bolts 33 are backed off. The cores having been lowered during the process of curing and the end plates 10 having been lowered with the cores, it is only necessary to strip off the side plates in order to remove the formed blocks. To do this the filler plank 32 is first removed and then the adjacent side plate 10 is shoved back. The first course of blocks is taken out and the side plates thus exposed are laid down on the bottom plates, this operation being continued until all of the rows of articles have been exposed and removed.

Figures 6 and 7 show a partition unit. In this unit the cores, instead of being lowered, are withdrawn endwise. The forms are below the level of the rails 5a and consist of bottom channels 35 resting on the side rails 4a and partition plates 36. Filler planks 37 and wedge bolts 38 are employed at one end of the unit as described in connection with the block unit. At each side of the form the partition plates 36 are spaced by wood partition stops 39 having openings 40 therein for cores 41. The partition plates 36 are notched as indicated at 42 to receive rods 43 which prevent outward movement of the partition stops 39 at their upper ends. At their lower ends they are connected to the bottom supports 35 by a lagscrew or a nail. When the partitions have been poured the cores 41 are withdrawn endwise and after curing has been completed the partition units are stripped from the mold in a manner similar to that employed with the block molds.

It will be noted that the partitions thus formed are of half the width of the unit. The cores run to the center and are there supported by partition stops 39a.

Figures 8 and 9 show a unit generally similar to that employed for the blocks, except that the end channels 6b are lowered. Supporting channels 44 are secured to the bottom of the rails 5b and longitudinally extending division plates 45 are employed for dividing the unit into longitudinal spaces of the proper width to make slabs of different sizes. Cores 46 are placed between the division plates so as to properly form the slabs.

The depth of the slabs is determined by filler channels 47 lying between the division plates 45 and the sides of the cores 46. It will be understood that in practice the mold cavities are filled to a level corresponding to the top of the side rails 5b. In this form of apparatus the partitions are tightened relative to one another by wedge bolts 48 fitting into wedge blocks 49 lying between the upper and lower inside flanges of the rails 5b.

Figure 10 shows a side plate 11c having a rubber facing 50. This eliminates the necessity for greasing and insures that the cement mix will not stick to the mold. It will be understood that the various mold parts may all have rubber faces, as desired.

Figure 11 shows a block unit with means for lowering the cores even though the cover is over the unit. In this view, parts corresponding to similar parts already described are given the same reference character with a b suffixed thereto. In this form of apparatus the core supporting channels 29b rest on longitudinally extending channels 51. A channel 51 is provided at each side of the apparatus and at end is provided at the top and bottom with an eye-bolt 52. A shaft 53 extends through openings in the channels 4b and is provided with a hand crank 54. The crank projects sidewise a sufficient distance to lie clear of the cover C when it is in lowered position, and the cover is provided with a slot 55 so that it may fit down over the shaft 53.

A cable 56 is dead-ended in an I-bolt 52 on the upper side of each channel 51, extends upwardly over a pulley 57 and thence downwardly to the shaft 53. It is wrapped a few turns around the shaft and then extends upwardly and is dead-ended in the lower I-bolt bolt 52. The ends of the channels 51 remote from the shaft 53 are similarly rigged, except that the cables 58 are guided over pulleys 59 so that both ends of each channel can be raised simultaneously by the same crank.

I have illustrated and described a preferred embodiment of the invention. It will be understood, however, that it is not limited to the form shown, but may be otherwise embodied within the scope of the following claims:

I claim:

1. Apparatus for casting cementitious articles, comprising a side wall arranged to form the faces of adjacent articles, the side wall being formed in two parts, each having a smooth face and an ornamental face, different faces of the two parts being adapted to lie against one another.

2. Apparatus for making cementitious articles, comprising a mould and a material mixer movable thereover, said mould being supported at intervals such that it is vibrated by the operation of said mixer.

3. Apparatus for making cementitious articles, comprising a series of stationary frames connected end to end to form track rails for a traveling mixer, said frames supporting a series of moulds, each frame having independent raising and lowering apparatus for mould members.

4. Apparatus for making cementitious articles, comprising a series of stationary frames connected end to end to form track rails for a traveling mixer, supporting a series of moulds, each frame having heating means and independent curing covers.

5. Apparatus for making cementitious articles, including a mold supported by spaced rails within a curing chamber, and a traveling mixing device for filling said mold with a cementitious mix, coacting with said rails.

6. Apparatus for making cementitious articles comprising the combination with a traveling mixer, of molds within a curing chamber, said molds having side rails adapted to be traversed by the mixer.

7. The method of making cementitious articles which includes filling a vibrated mold with a churning cementitious mix and, with substantially no movement of the mold, applying heat in such manner that the entire mold is surrounded with a heated atmosphere, thus curing the article therein.

8. The method of making cementitious articles, which includes providing in a curing chamber a mold with a core, vibrating and filling the mold with a churning cementitious mix, withdrawing the core after the mix has set sufficiently to be self-sustaining, and curing the article thus formed while it remains in the curing chamber.

9. The method of making cementitious articles, which includes providing in a curing chamber, a mold having walls and a core, vibrating and filling the mold with a churning cementitious mix, withdrawing the core and removing a mold wall after the article thus formed has set sufficiently to be self-sustaining, and curing the article while it remains in the curing chamber.

10. The method of making cementitious articles, which includes providing in a curing chamber, a mold having walls, vibrating and filling the mold with a churning cementitious mix, removing a mold wall after the mix has set sufficiently to be self-sustaining, and curing the article thus formed while it remains in the curing chamber.

11. Apparatus for making cementitious articles, including a mold having a bottom and side walls adapted for the formation of a cementitious article, a curing chamber completely surrounding the mold, and mixer means for supplying a churning cementitious mix to the mold while it is in the curing chamber, whereby movement of the mold from the time it is filled until the article therein is curved, is avoided.

12. Apparatus for making cementitious articles, including a mold having a bottom and side walls for the formation of a cementitious article, a curing chamber, the mold being supported by spaced rails in the curing chamber, the curing chamber completely surrounding the mold, and mixer means for supplying a churning cementitious mix to the mold while it is positioned in the curing chamber, whereby movement of the mold from the time it is filled until the article therein is cured, is avoided.

13. The method of making cementitious articles, which includes providing in a curing chamber a mold with a core, vibrating and filling the mold with a churning cementitious mix, permitting the mix to set sufficiently to be self-sustaining and then so moving the core that it is out of contact with the formed article, and curing the formed article while it remains in the curing chamber.

14. Apparatus for making cementitious articles, comprising a curing chamber, a mold positioned therein, and a traveling mixing device for delivering a cementitious mix into said mold.

In testimony whereof I have hereunto set my hand.

ALBERT HENDERSON.